April 20, 1965  J. A. PSENKA  3,178,800
SHELL BROACH
Filed April 10, 1961  7 Sheets-Sheet 1

INVENTOR.
JOSEPH A. PSENKA
BY Whittemore Hulbert & Belknap
ATTORNEYS

April 20, 1965  J. A. PSENKA  3,178,800
SHELL BROACH

Filed April 10, 1961  7 Sheets-Sheet 3

*INVENTOR.*
JOSEPH A. PSENKA
BY
Whittemore, Hulbert
& Belknap
ATTORNEYS

April 20, 1965   J. A. PSENKA   3,178,800
SHELL BROACH

Filed April 10, 1961   7 Sheets-Sheet 4

INVENTOR.
JOSEPH A. PSENKA
BY
ATTORNEYS

April 20, 1965    J. A. PSENKA    3,178,800
SHELL BROACH

Filed April 10, 1961    7 Sheets-Sheet 5

INVENTOR.
JOSEPH A. PSENKA
BY
ATTORNEYS

April 20, 1965 J. A. PSENKA 3,178,800
SHELL BROACH
Filed April 10, 1961 7 Sheets-Sheet 6

INVENTOR.
JOSEPH A. PSENKA
BY
*Whittemore, Hulbert*
*& Belknap*
ATTORNEYS

April 20, 1965     J. A. PSENKA     3,178,800
SHELL BROACH Filed April 10, 1961     7 Sheets-Sheet 7

INVENTOR.
JOSEPH A. PSENKA
BY
ATTORNEYS

United States Patent Office 3,178,800
Patented Apr. 20, 1965

3,178,800
SHELL BROACH
Joseph A. Psenka, Bloomfield Hills, Mich., assignor to National Broach & Machine Company, Detroit, Mich., a corporation of Michigan
Filed Apr. 10, 1961, Ser. No. 101,887
5 Claims. (Cl. 29—95.1)

The present invention relates to a broach and more particularly, to a broach comprising a plurality of sections, a leading one of which is a roughing section adapted to rough out the teeth of a gear or splined element, and a following section of which is a finishing section adapted to finish the teeth of the workpiece with extreme accuracy.

Broaches of the type described have been utilized in the industry. However, certain problems have been encountered. One of the main problems is that the side of the part which is produced by the obtuse side of the broach has more stock removed from it than from the side of the part which is produced by the acute side of the broach. This usually results in the acute side not cleaning up fully so that the errors of form introduced into the part by the roughing section of the broach are not entirely corrected or eliminated by the side shaving shell forming the finishing section of the broach.

The present invention relates primarily to different ways of correcting errors of form in the broach part which are introduced into the part by the roughing section of the broach. This is accomplished by providing an improved side shaving shell which is adapted to be mounted at the rear of the roughing section of the broach so as to completely remove the aforesaid errors.

It is an object of the present invention to provide a full form finishing broach of the character described in which the finishing section is connected to the leading roughing section in such a manner that the finishing section will locate itself accurately in the workpiece and will therefore produce teeth on the workpiece which, for practical purposes, have the same accuracy as the teeth on the finishing section of the broach.

Another object of the present invention is to provide a full form finishing broach which includes a side shaving shell that has on the front half of the side shaving shell cutting teeth in which the obtuse sides thereon are straight so as to actually follow the helix without any backoff angle and the acute sides thereon are backed off to provide the cutting and on the rear half of the shell the acute sides of the cutting teeth are straight so as to become guiding teeth and the obtuse sides are backed off to perform the cutting.

A further object of the present invention is to provide a full form finishing broach which includes a side shaving shell having the teeth thereon so arranged as to equalize the amount of stock removal from both the acute and the obtuse sides.

A still further object of the present invention is to provide a broach which has a side shaving shell thereon wherein the teeth thereof are arranged so that the backoff angle on the acute side is greater than the backoff angle on the obtuse side so as to increase the resistance of the tool to move into the obtuse side of the part.

Still another object of the present invention is to provide either an internal or external broach having a finishing section wherein the leads on the obtuse and acute sides of the teeth are decreased from the true lead so that the obtuse side produces a counter force to the natural rotative force that the acute side produces to pull the part into the obtuse side, thereby balancing stock removal from the broach part.

Still another object of the present invention is to provide a full form finishing broach which has a roughing section and a finishing section which is adapted to fit tightly on the roughing section so as to prevent relative movement between the roughing and finishing sections.

Other objects and features of the invention will become apparent as the description proceeds, especially when taken in conjunction with the accompanying drawings illustrating preferred embodiments of the invention, wherein.

In the broaching of internally toothed members, such as internal gears, spline members or the like, it is possible to produce broaching elements having substantially any required degree of accuracy. However, in use, such a broaching element can reproduce itself with substantially perfect accuracy only when it is not subjected to negative factors occasioned by an earlier stage of the broaching operation. The present invention relates to a broach which has a roughing section and a finishing section, with the finishing section taking the form of a replaceable side shaving shell which is affixed to and located on the rear end of the broach body following the roughing section, such as disclosed in my Patent 2,987,801 which issued on June 13, 1961. Certain aspects of the invention may be embodied in a finishing broach construction whether formed as a part of a broach including the finishing construction or formed as a separate broach.

Figure 1:
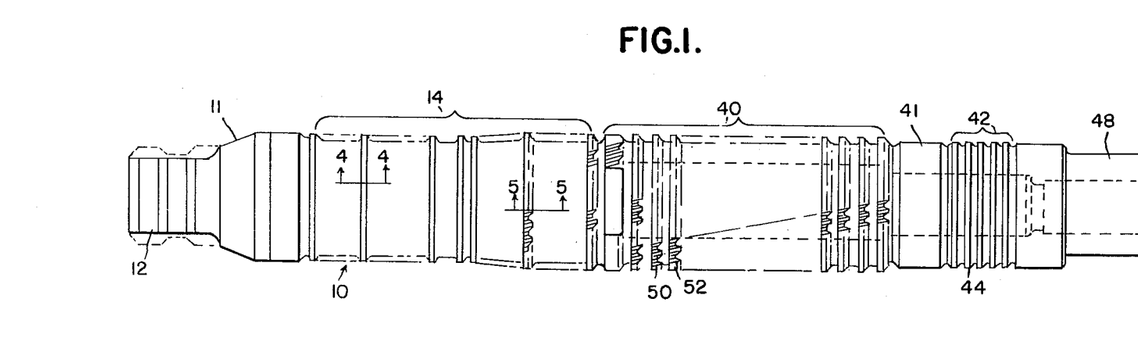
FIGURE 1 is a side elevation of the broach assembly.
Figures 2, 3, 4, 5:
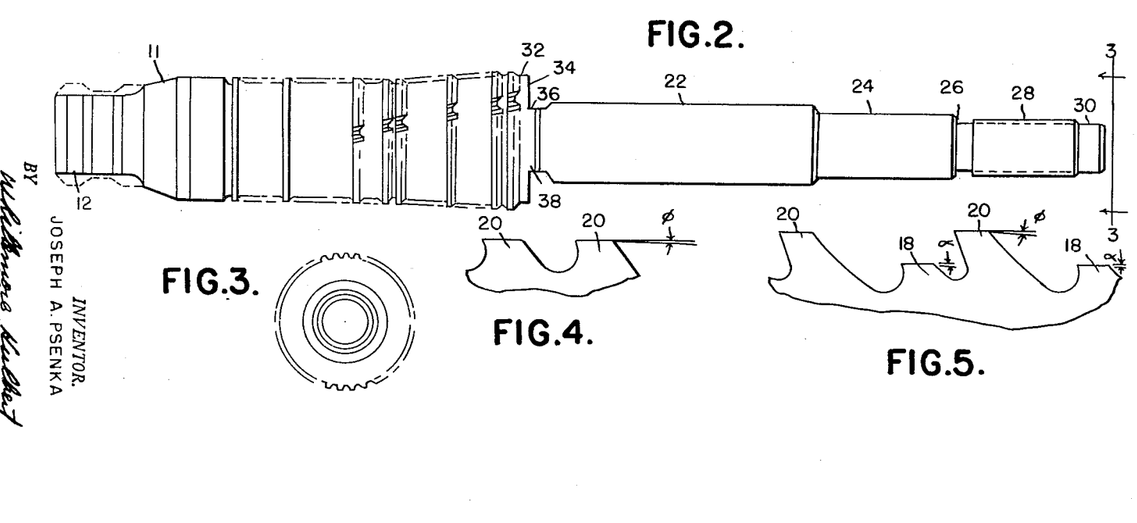
FIGURE 2 is a side elevation of the leading roughing section of the broach.
FIGURE 3 is an end view of the leading section of the broach seen from the right in FIGURE 2.
FIGURE 4 is an enlarged view of adjacent teeth illustrated in FIGURE 1 taken on the line 4—4 thereof.
FIGURE 5 is an enlarged view of adjacent teeth illustrated in FIGURE 1 taken on the line 5—5 thereof.

Referring now to the drawings, the leading section of the broach assembly 10 is shown in FIGURES 1 and 2 and is designated by the numeral 11 and comprises a head 12 adapted to be connected to a suitable device for pulling the broach through a hole in a workpiece. Conveniently, the roughing section of the broach is indicated generally at 14 and includes a series of continuous interrupted annular blades or ribs 16 adapted to form separate cutting teeth 20. The rear part of the roughing section includes alternate round and spline teeth. The round teeth or blades 18 are adapted to machine the hole in the workpiece to true cylindrical formation. The spline cutting teeth 20 are progressively stepped from front to rear and are backed off on the top at an angle phi and the sides thereof are relieved to within 1/64 inch to 3/64 inch of the top of the profile. The round teeth 18 are also backed off at an angle alpha.

It will be appreciated that the cutting teeth 20 are arranged in axial alignment if the broach 10 is for the purpose of producing spur teeth, or in helical alignment if the broach is for the purpose of producing helical teeth. The term "longitudinal alignment" or the like is intended to cover arrangements for producing both spur and helical gears.

At the following end of the roughing section 14 of the broach assembly 10 is a cylindrical support 22 having a reduced portion 24 which forms a shoulder 26. Rearwardly of the reduced portion 24 a support portion 22 is threaded as indicated at 28. Rearwardly of the threaded portion 28 is provided a cylindrical support portion 30.

Directly to the rear of the final blade of the roughing section 14 there is a cylindrical surface 32, the opposite sides of which are machined away as indicated to form rearwardly facing flat abutment surfaces 34 and radially outwardly facing flat surfaces 36. This arrangement provides a flat transversely extending key 38. As shown in FIGURE 1, the following finishing broach section or side shaving shell 40 is assembled on the support portion 22 of the leading section 11. Rearwardly of the finishing section or shell 40 is located a spacer 41 followed by a round shell 42 comprising a plurality of continuous round uninterrupted blades or ribs 44. The finishing shell 40, spacer 41 and side shaving shell 42 are retained on the support portion 22 of the leading section 11 in assembled relation by nut 48 threaded to the threaded portion 28 of the leading broach section 11.

The finishing section or shell 40 is essentially tubular in shape having toothed cutting blades 50 forming longitudinally aligned series of cutting teeth 52. Again, the cutting teeth extend in axially disposed series if the broach 10 is to form a spur member and the series are helically aligned if the broach 10 is used to produce helical teeth on the workpiece. At the leading end of the finishing section 40, a notch or keyway is provided which extends diametrically across the leading end thereof and is dimensioned to receive the key 38 at the following end of the roughing section of the broach. The finishing section 40 is generally provided with a central opening, the intermediate portion of which is enlarged to provide clearance and the ends of which are of slightly reduced size to provide guide surfaces which are guidingly received on the cylindrical surface of the support portion 22 of the leading section 11 of the broach 10.

It will be observed in FIGURE 1 that the nut 48 has the front portion or forward end thereof engageable with the rear end of the round shell 42 so as to urge the spacer 41 into engagement with the shoulder 26. With such a key and keyway construction between the roughing and finishing sections a small clearance in the amount of .002 inch is sufficient to permit limited circumferential relative movement between the roughing and finishing broach sections. In addition, the key and keyway constructions of the sections are properly related with respect to the cutting teeth thereon so that the cutting teeth 52 on the finishing section are in substantial true alignment with the teeth 20 of the roughing section. Nevertheless, as the finishing section 40 moves into action, it is permitted to float so that it aligns itself with substantial perfect accuracy with respect to the teeth as partially roughed out by the roughing section of the broach. The teeth 52 of the finishing section 40 are of less height than those of the roughing section and hence, cut only on the sides. The top portions of the teeth 52 are thus able to pass in clearance through the grooves or slots provided at the bottom of the tooth spaces cut by the roughing section. The widths of the side shaving teeth increase from front to rear. The broach assembly just described is disclosed in the aforesaid Patent 2,987,801.

Certain problems have been encountered with the use of side shaving shells 40 of the type just described in that the side of the part which is produced by the obtuse side of the broach has more stock removed from it than from the side of the part which is produced by the acute side of the broach. This results sometimes in the acute side not cleaning up entirely so that the errors of form introduced into the broach part by the roughing section are not eliminated by the side shaving shell in a practical length of shell.

In order to compensate for this particular condition, the amount of stock removal on the circular tooth thickness has been increased from .002 inch to .005 inch. In addition, an entirely new approach in design is utilized such that on half the cutting teeth of the shell the obtuse side will be straight without any backoff angle so as to actually follow the helix and the acute side thereon is backed off to provide the cutting. The straight obtuse side provides a control side and as the broach moves along through the part, the obtuse side keeps or prevents the part from drifting into it. Due to the fact that the obtuse side has no backoff angle, the cutting is accomplished entirely on the acute side. On the remaining or rear half of the broach, the acute side is straight with no backoff angle and provides a control side which keeps the part from drifting into it while the obtuse side is backed off and provides the requisite cutting action. In this manner, the amount of stock removal from both the acute and obtuse sides is equalized.

Figure 6:
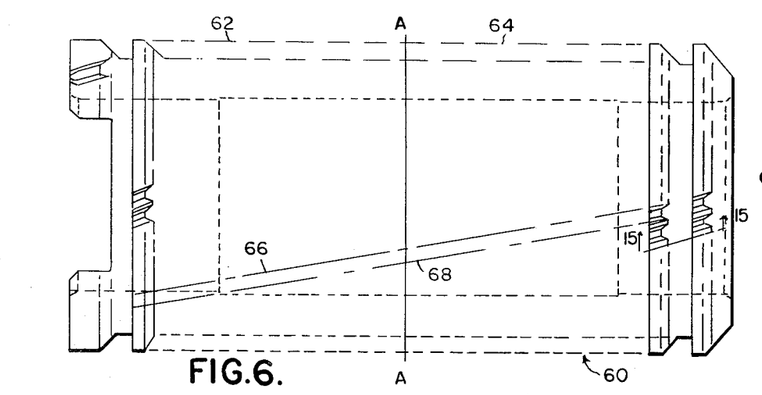
FIGURE 6 is an enlarged side elevation of a side shaving shell.
Figure 7:
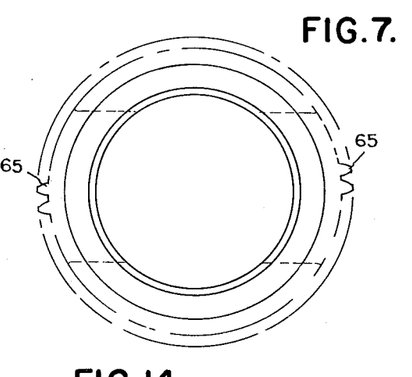
FIGURE 7 is a right hand end view of the shell shown in FIGURE 6.

FIGURE 6 shows a side shaving shell 60 which is adapted to fit on the roughing section in the manner similar to that described for FIGURE 1. Line A—A of FIGURE 6 divides the shell 60 into two halves or parts of substantially equal widths which are designated by the numerals 62 and 64. The obtuse sides of the longitudinally aligned side cutting teeth 65 are represented diagrammatically by the line 66. The acute sides of the longitudinally aligned side cutting teeth 65 are diagrammatically represented by the line 68. In the shell part 62 of the side shaving shell 60, the obtuse sides are straight with no backoff angle, thereby providing guiding action, while the corresponding acute sides are backed off and provide the requisite cutting action. The reverse is true for the broach part 64 in that the obtuse sides are backed off and provide the requisite cutting, while the acute sides are straight and provide the necessary guiding action.

Figure 8:
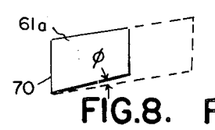
FIGURES 8–10 are various modifications of a finishing tooth having the acute side backed off.
Figure 9:
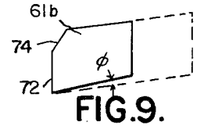
Figure 10:
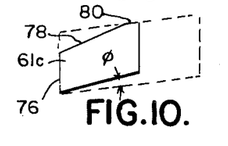

FIGURES 8–10 represent the construction of a tooth 61 in the first half or part 62 of the shell 60. FIGURE 8 shows a tooth 61a having a cutting edge 70, with the acute side thereof backed off at an angle Phi. The obtuse side of the tooth 61a is straight so as to provide guiding action to prevent the broach part from drifting into the acute side.

FIGURE 9 shows another modification of the tooth designated by the numeral 61b. The cutting edge 72 has a chamfer 74 which insures that there will be no cutting action on the obtuse side. The acute side of the tooth 61b is backed off at an angle Phi. While the cutting edge 72 has a chamfer 74, it should of course be understood that chamfer 74 may be rounded or take another form or shape so as to prevent cutting action on the obtuse side of the tooth 61b.

FIGURE 10 is still another modification of the tooth 61b as represented by the numeral 61c. The tooth 61c has a cutting edge 76 which has a long lead 78 on the obtuse side, with only approximately 1/16 or 1/8 of an inch of the obtuse side, as represented by the numeral 80, providing the requisite guiding action. The advantage of this construction over a straight chamfer or a round corner, as described for FIGURE 9, is successive face sharpenings on a broach utilizing a long lead does not require additional work chamfering the side of the tooth profile. With the construction shown in FIGURE 9, the chamfer 74 would have to be put back on the tool or broach after enough face sharpenings have been made on the broach to remove it. The length of the obtuse portion 80, which provides the small amount of guide surface, will depend upon the particular application. In any event, enough guide surface 80 has to be present to prevent metal pickup on the obtuse side. However, in certain applications, if the long lead 78 can be incorporated without metal pickup, it would be more desirable from a maintenance standpoint than to have very abrupt chamfers at the face of the broach.

Figures 11, 12, 12A, 13, 14, 14A, 15:
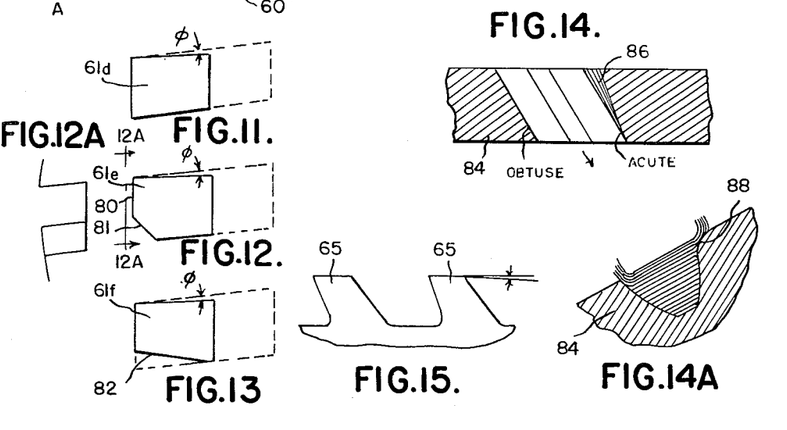
FIGURES 11–13 are various modifications of a finishing tooth having the obtuse side backed off.
FIGURE 12A is a front view of the tooth looking in the direction of arrow 12-A—12-A of FIGURE 12.
FIGURE 14 is a diagrammatic plan view of a portion of a workpiece illustrating the generating lines caused by the teeth of the broach.
FIGURE 14A is a diagrammatic view of the profile of the broach part illustrating the traces of the teeth of the broach.
FIGURE 15 is a side view of a pair of adjacent teeth looking in the direction of line 15—15 of FIGURE 6.

FIGURES 11–13 represent modifications of the tooth as contained in the rear half or part 64 of the shell 60. Tooth 61d has a backoff angle Phi on the obtuse side, with the acute side being straight and providing the requisite grinding action.

In FIGURE 12, a tooth 61e is backed off on the acute side and the cutting edge thereof, as represented by the numeral 80, has a chamfer 81 so as to prevent metal pickup. The remaining portion of the acute side is straight so as to provide the requisite guiding action. This figure is similar to FIGURE 9.

FIGURE 13, which is similar to FIGURE 10, has the obtuse side backed off at an angle Phi, with the acute side having a long lead 82.

Referring now to FIGURES 14 and 14A, there is diagrammatically illustrated the manner in which the teeth of the broach moving through the workpiece 84 in the direction of the arrow produce a plurality of generating lines as represented by numeral 86. The generating lines occur on the acute side and result in a rounding off of the profile as indicated at 88 in FIGURE 14A. As a result of the drift, the side of the tooth space which was cut by the acute cornered sides of the broach teeth is deformed as indicated by numeral 88. Thus, both lead and profile of the broach surface are in error. On the other hand, the side produced by the acute side of the broach shows no error and is correct throughout as to lead and profile.

Figures 16, 17, 18, 18A:
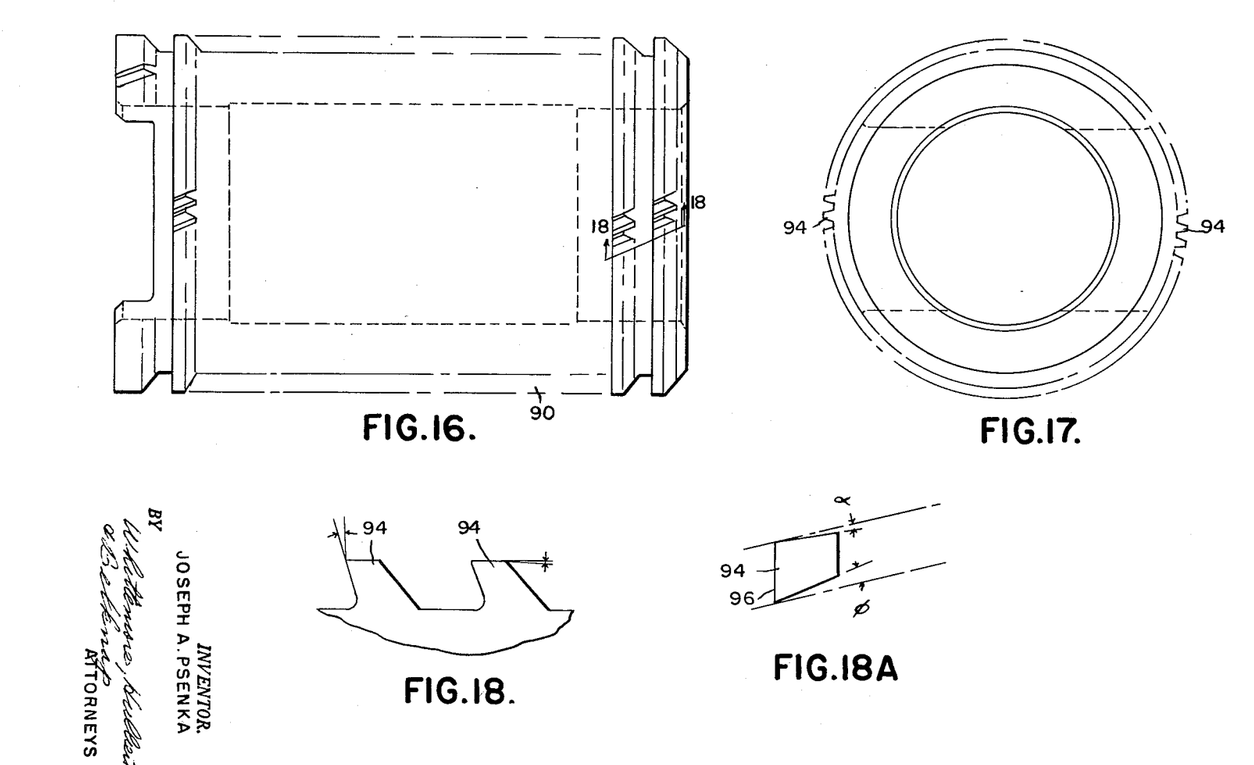
FIGURE 16 is another embodiment of the side shaving shell showing the elevation thereof.
FIGURE 17 is an end view of the shell down in FIGURE 16.
FIGURE 18 is a view of the teeth looking in the direction of line 18—18 of FIGURE 16.
FIGURE 18A is a diagrammatic view of a side shaving finishing tooth.

FIGURE 16 shows a modification of the finishing shell and is designated by the numeral 90. Shell 90 has a series of longitudinally aligned side cutting teeth 94 which progressively increase in width. In order to prevent the obtuse side of the broach shell 90 from removing more material from the part on circular tooth thicknesses than the acute side, it has been found that changing the backoff angle on the acute side will be of some benefit in correcting the errors of form. FIGURE 18A shows a tooth 94a having a cutting edge 96, with the acute side backed off at an angle Phi and the obtuse side backed off at an angle Alpha, with the angle Phi being greater than the angle Alpha. With such a construction, the greater the backoff angle on the acute side, the freer will be the cutting action thereon and the less tendency there will be to pull the part into the obtuse side and conversely, the lower the backoff angle on the obtuse side, the greater will be the tendency for resistance of the broach to move into the obtuse side of the part.

Originally, finishing shells of the type described had a three-quarter degree backoff angle on both the acute and obtuse sides of the teeth for both spur and helical. However, due to size reduction of the tool with successive face grindings that produced undersized parts in a relatively short time, the backoff angles were decreased to one-half degree on both sides of the teeth on both spur and helical applications. With the present invention, it has been found that the aforesaid problem is substantially eliminated by decreasing the obtuse backoff angle to one-quarter degree and increasing the acute backoff angle to three-quarter degree. The net result is a broach that has as much tool life as if both sides were backed off to one-half of a degree.

Figure 19:
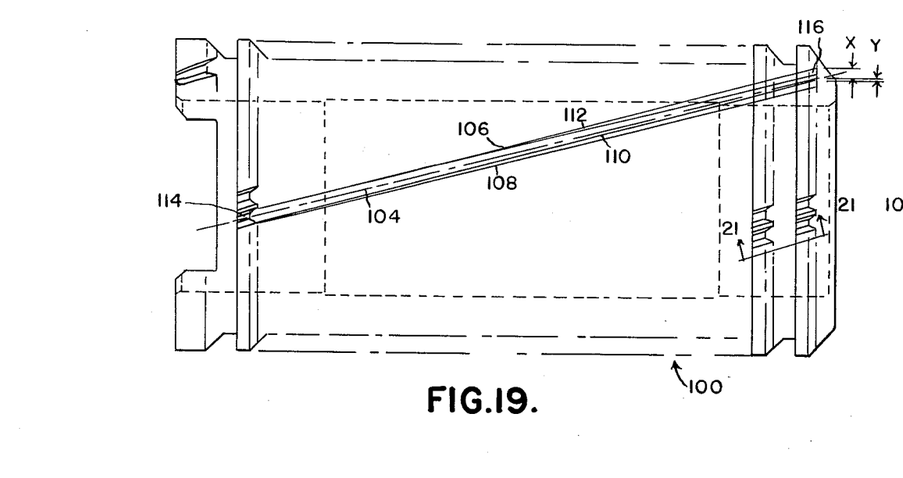
FIGURE 19 is a side elevation of still another embodiment of the side shaving shell.
Figure 20:
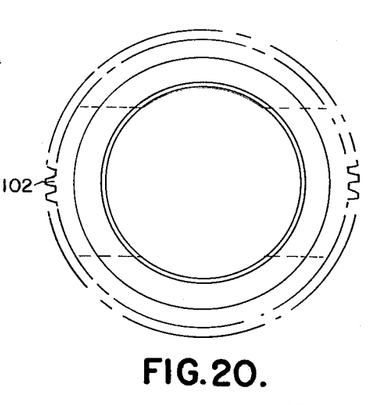
FIGURE 20 is an end view of the side shaving shell shown in FIGURE 19.
Figure 21:
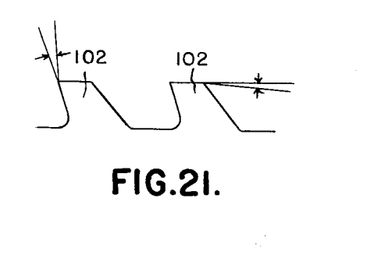
FIGURE 21 is a view of adjacent teeth of the side shaving shell looking in the direction of line 21—21 of FIGURE 19.

FIGURE 19 shows another modification of the side shaving shell which is represented by the numeral 100. The shell 100 has a series of longitudinally aligned helical teeth 102. In the past, the teeth 102 have followed a true lead center line as is diagrammatically represented by the line 104. With this type of prior art construction, the obtuse sides of the teeth were on a true lead as is diagrammatically represented by the line 106. Also, the acute sides of the teeth were also on a true lead as represented by the line 108. However, with such a construction, it was found that the obtuse side of the teeth 102 removed more stock from the part on circular tooth thickness than the acute side. In order to correct the errors, it was found that it was desirable to change the leads on the teeth from true leads as just described so as to actually produce a counter force to the natural rotative force that the acute side is producing. This is accomplished by decreasing the lead on the obtuse and acute sides of the teeth. In other words, the helix angle on the acute and obtuse sides is increased. However, the total amount of stock removal is the same as if true leads are actually present. By incorporating the changes in the leads, the obtuse side presents a counter force that balances out the natural tendency of the acute side to pull the part into the obtuse side. Described in another manner, the center line of the tooth is adapted to move at a different lead than the broach itself is moving or turning. The acute side which represents an off lead condition is represented by the numeral 110, while the off lead condition in the obtuse side is represented by the numeral 112. With such a construction, the amount of off lead of the obtuse side is greater than the amount of off lead on the acute side and is shown in FIGURE 19 by the relationship of X to Y in which X is greater than Y.

Figure 22:
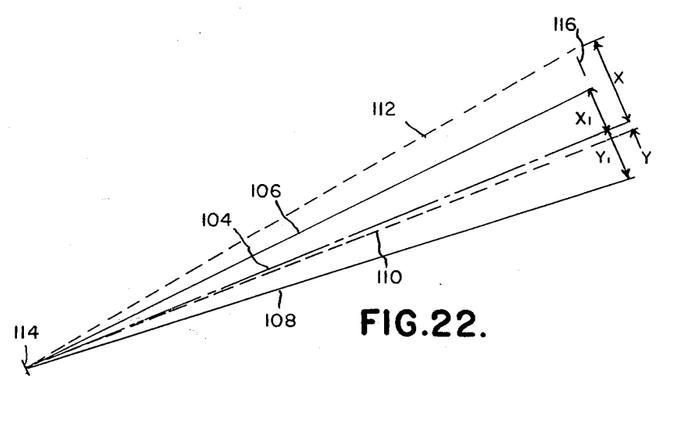
FIGURE 22 is a diagrammatic representation illustrating the deviation of the leads on the acute and obtuse sides from the true lead center line of the side shaving shell.
Figure 23:
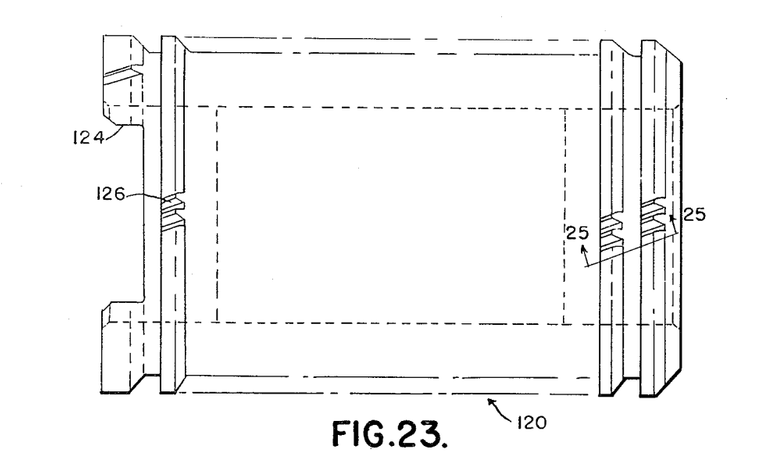
FIGURE 23 is a side elevation of still another embodiment of the present invention.

With the present invention, the lead on the obtuse side and acute side would be shorter than that caused by the normal cut per tooth. The center line of the teeth would be on a shorter lead. FIGURE 22 diagrammatically illustrates the longitudinally aligned first and last teeth on the shell represented by the numerals 114 and 116 respectively. When the teeth are on the true lead center line 104, $X_1$ equals $Y_1$. However, when the teeth are not symmetrical about a true lead center line, X is greater than Y as previously described. In each case shown, X plus Y equals Z and $X_1$ plus $Y_1$ equals Z where Z is the total stock removal. This embodiment provides a broach having finishing teeth in which the center line of the finishing teeth traverses a lead path divergent from the path which the broach proper is traversing.

As previously described, the finishing shell is adapted to float with reference to the roughing section. However, in the embodiment shown in FIGURE 26, leading section 11 has a flat transversely extending key or tang 38 as in the other embodiments. However, the finishing section or shell 120 is provided with a notch or keyway 124 which is of a size so as to tightly grip the key or tang 38 on the roughing section, thereby preventing circumferential and axial movement between the finishing and roughing sections as in the other embodiments.

Figure 26:
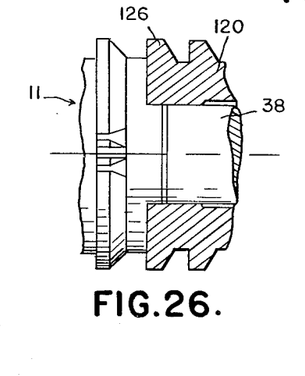
FIGURE 26 is a fragmentary sectional view showing the relationship between the side shaving shell and the roughing section.

In addition, the first tooth of the shell 120 is a cutting tooth 126 backed off on the sides. Heretofore, the first tooth has served as a pilot. The tooth 126 is reduced on circular cross section and is smaller than any of the other longitudinally aligned teeth 123 of the roughing section.

Such a construction reduces the possibility of any loss of control and any unnecessary movement of the shell 120.

Figure 27:
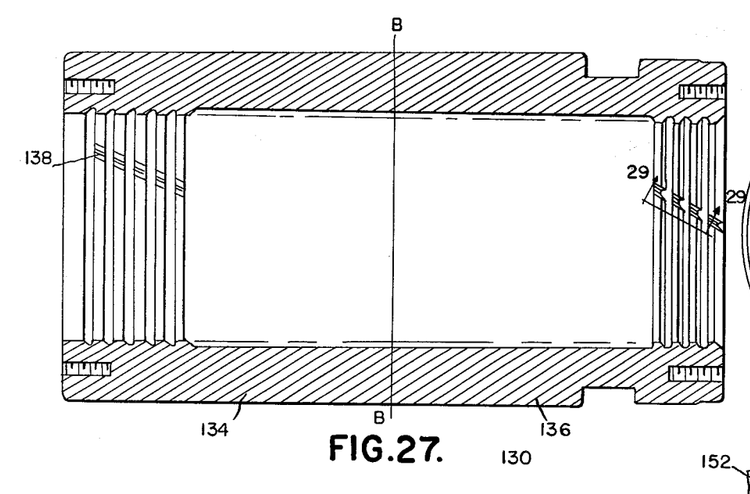
FIGURE 27 is a sectional elevational view of a finishing shell which is adapted to finish external parts.
Figure 28:
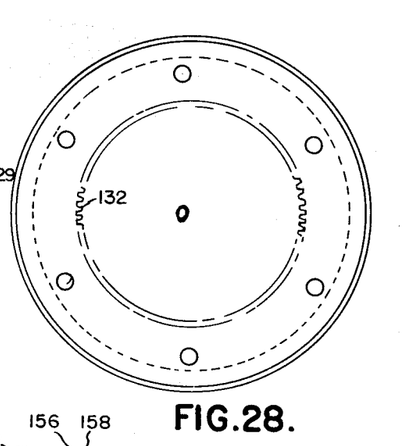
FIGURE 28 is a right hand end view of the shell shown in FIGURE 27.
Figure 29:
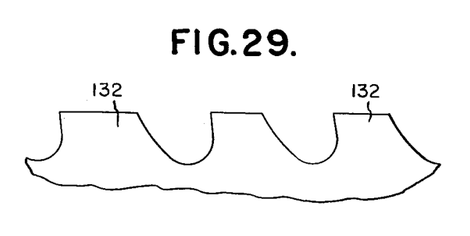
FIGURE 29 is a view of longitudinally aligned teeth looking in the direction of arrow 29—29 of FIGURE 27.

FIGURE 27 shows a shell broach 130 for producing external parts. The shell broach 130 is adapted to follow either a generating type shell, a Fellows gear shaped gear or a hobbed gear. The longitudinally aligned finish cutting teeth 132 increase in tooth width from the front of the shell to the rear, the amount of stock removal being dependent on this increase in tooth width. The sides of the teeth are backed off sharp.

The backoff angles Phi and Alpha are the backoff angles of the obtuse and acute sides of the teeth respectively. The backoff angles may be equal or of greater magnitude one to the other. The center line of the teeth 132 may either follow a true lead or a higher or lower than true lead.

The broach shell 130 is divided in half about line B—B so that on the forward half or part 134 of the shell 130, the obtuse sides of the teeth are straight or unrelieved and the acute sides are backed off to provide the requisite cutting action. In the rear half or part 136 of the broach shell 130, the obtuse sides are backed off to provide the requisite cutting action and the acute sides are straight. By straight or unrelieved is meant teeth which are parallel to either a true lead or a desired higher or lower lead.

The first tooth 138 of the broach may be either a pilot tooth, that is, a non-cutting tooth with an entering lead, or it may be an exceptionally heavy bumper tooth backed off on the sides to initiate some cutting.

Another problem which has been encountered with the side shaving shell broaches has been that the front pilot of the shell constituted a dwell area in which a part, if it were sufficiently short in length of cut, might possibly be free to fall upon the front pilot. This of course is undesirable for pull-up machines in that if the part would drop away from the base plate fixture, chips fall or might be washed in on top of the part. When the shell begins its cutting action and brings the part up to the face plate fixture, an off lead condition results in the part.

Figure 30:
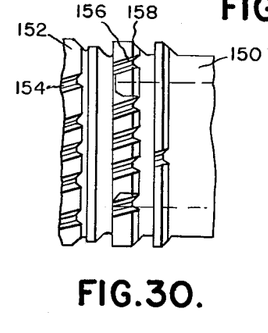
FIGURE 30 is a fragmentary elevational view showing the last row of cutting teeth on the roughing section in line with the teeth on the pilot of the finishing shell.

In order to overcome this objection, I have devised a structure, a part of which is shown in FIGURE 30, wherein the shell 150 is interlocked in such a position on the roughing portion 152 that the last row of cutting teeth 154 on the roughing section are in line with the teeth 156 on the pilot 158 of the shell 150. This design feature provides better control of the part so that the part is under constant broaching pressure as it is moving over the pilot 158 of the shell 150 since the last roughing teeth are in contact with the work.

Figure 24:
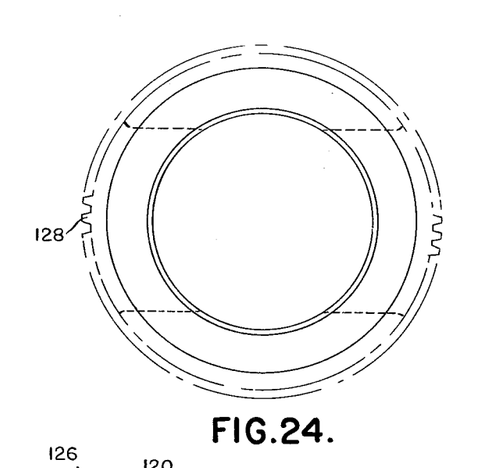
FIGURE 24 is an end view of the side shaving shell shown in FIGURE 23.
Figure 25:
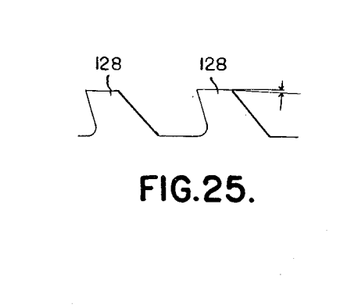
FIGURE 25 is a view of adjacent teeth looking in the direction of line 25—25 of FIGURE 23.
Figure 31:
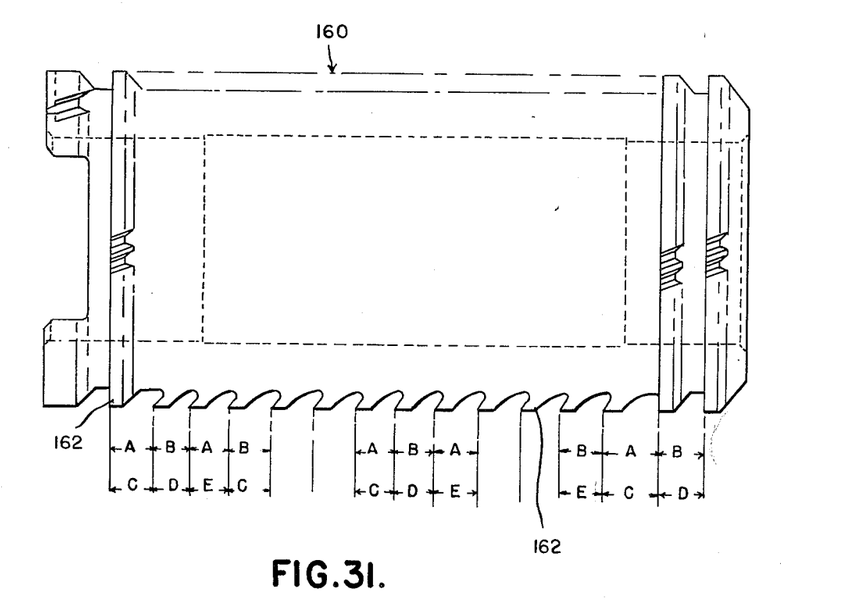
FIGURE 31 is an elevational view of a finishing shell having a staggered or differential pitch which illustrates another modification of the present invention.

FIGURE 31 illustrates another modification of the present invention. The improvement relates specifically to the side shaving shell 160 which is adapted to be mounted on a leading roughing broach section 11, as shown in FIGURES 1 and 2, which is provided with alternate round and spline cutting teeth 18 and 16 respectively. The end view of the shell 160 is similar to FIGURE 24.

A problem has been encountered in side shaving shell broaches wherein surge marks result in the profile of the broach part along its length. With the type of broach just described, the pitch of the broach is uniform so that the surge marks in the broach part are spaced apart at an equal distance.

The surge marks are caused by the fact that a varying number of teeth are in the workpiece at any moment. The teeth will vary in the following manner: in one instance, for example, a maximum of four teeth and a minimum of three teeth are in the workpiece; as another example, a situation may result where a maximum of two teeth and a minimum of only one tooth are provided in the workpiece. Under these conditions there are load changes on the broach and on the machine from 25% to 50%. Since the pitch of the teeth is held uniformly, the broach force load changes occur at very specific positions when the teeth are in the workpiece. This results in surge or harmonic marks.

In order to alleviate this condition, a staggered pitch or differential pitch is provided in the side shaving shell 160. In other words, the pitch from tooth to tooth is not uniform. The use of a differential pitch on the side shaving shell 160 results in a condition in which the longitudinally aligned teeth 162 of the side shaving shell 160 do not always surge at the same point in the broached part. The teeth 162 are also arranged in circumferentially aligned groups of progressively increasing width and height. The corresponding edges at both sides of the teeth are circumferentially stepped so as to cut on the sides thereof.

The side shaving shell 160 may be adapted for a multiple pitch construction. As examples, both a double staggered pitch and a triple staggered pitch broach are illustrated. The double staggered pitch broach, for example, may be of the type where the pitch A equals ½" and the pitch B equals $\%_{16}$". In a triple staggered pitch broach, as an example, C equals $1\%_{32}$", D equals ½" and E equals $1\%_{32}$". The pitch distances are alternately repeated longitudinally of the broach as illustrated. It should be understood that this invention is also applicable to quadruple pitch broaches.

This approach has proved very effective in controlling surge marks in round hole broach applications since the teeth do not always surge at the same point in the workpiece. In addition, this invention is also applicable to side shaving shells or to solid side shaving broaches which have alternate round and spline teeth wherein the pitch of both the round teeth and the side shaving spline teeth is varied.

Figure 32:
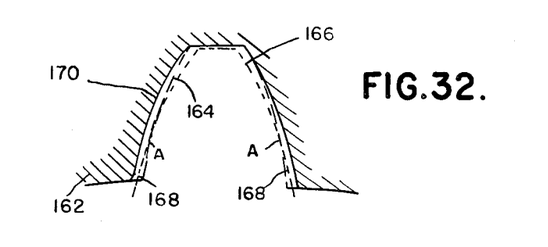
FIGURE 32 is a diagrammatic illustration illustrating the manner in which the entering tooth of the finishing section contacts the form produced by the roughing section.

FIGURE 32 is a diagrammatic illustration of how the first entering finishing tooth of a broach cuts the form of the tooth space produced by the roughing teeth.

This may be accomplished by utilizing a broach which has a roughing section and a finishing section which can either be an integral part of the broach, in other words, a solid one-piece broach, or it may have a replaceable finishing shell which is affixed to and located on the rear end of the broach body following the roughing section. The finishing section of the broach may have either alternate interrupted and uninterrupted cutting blades or only interrupted blades, with the interrupted blades forming longitudinally aligned series of teeth. The longitudinally aligned teeth increase in width from the leading end to the following end of the finishing section. The first finishing tooth cuts only a portion of the profile or form near the minor diameter thereof. As the broach cuts circumferentially, the next succeeding teeth increase in width so as to gradually cut more of the profile until finally the remaining finishing teeth encompass the entire profile up to the major diameter.

As an example, a side shaving shell broach or a solid broach is utilized which is constructed and arranged so that the finishing teeth cut the form 164 of the tooth space in the workpiece 162. The form 164 is produced by the roughing teeth of the broach. The first entering tooth of the finishing broach is represented by the dotted line 166 and contacts the tooth form 164 at points A so as to remove the triangularly shaped material 168 from the form 164. With such a construction, the finishing tooth 166 starts cutting near the minor diameter of the broach. The succeeding finishing teeth cut in increments until the remaining teeth encompass the entire profile up to the major diameter thereof until the requisite profile or form 170 is obtained. This construction permits the first finishing tooth 166 to take the greatest cut at the strongest part of the tooth.

The drawings and the foregoing specification constitute a description of the improved shell broach in such full, clear, concise and exact terms as to enable any person skilled in the art to practice the invention, the scope of which is indicated by the appended claims.

What I claim as my invention is:

1. A broach having a series of longitudinally aligned finish cutting teeth arranged in circumferentially aligned groups, the pitch between adjacent groups of teeth being different from the pitch adjacent thereto.

2. A broach having a series of longitudinally aligned finish cutting teeth, said teeth being of less height than the height of the teeth on the workpiece, said teeth being of progressively increasing width, corresponding edges at both sides of said teeth being circumferentially stepped so as to cause each of said teeth to cut substantially entirely at the sides thereof, the pitch between longitudinally adjacent teeth being slightly different from the pitch adjacent thereto.

3. A broach assembly comprising a leading section having longitudinally aligned series of progressively stepped cutting teeth, and a support portion following said cutting teeth having a cylindrical support surface, a finishing broach shell mounted on said support surface, said shell having longitudinally aligned series of finishing teeth arranged in circumferential groups, said finishing teeth progressively increasing in width from the front toward the rear of the shell, the pitch between adjacent groups of teeth being different from the pitch adjacent thereto, and means for retaining the shell on said support portion.

4. The broach assembly defined in claim 3 wherein the teeth of the finishing shell have a double staggered pitch between adjacent groups.

5. The broach assembly defined in claim 3 wherein the teeth of the finishing shell have a triple staggered pitch between adjacent groups.

References Cited by the Examiner

UNITED STATES PATENTS

| | | | |
|---|---|---|---|
| 1,197,132 | 9/16 | La Ponite | 29—95.1 |
| 1,310,934 | 7/19 | Suverkrop | 29—95.1 X |
| 1,806,552 | 5/31 | Atwood | 29—95.1 |
| 1,935,774 | 11/33 | Halborg | 29—95.1 |
| 1,969,977 | 8/34 | Halborg | 29—95.1 |
| 2,011,630 | 8/35 | Halborg | 29—95.1 |
| 2,041,759 | 5/36 | Halborg | 29—95.1 |
| 2,060,889 | 11/36 | Nilsson | 29—95.1 |
| 2,078,632 | 4/37 | Halborg | 29—95.1 |
| 2,161,901 | 6/39 | Praeg | 29—95.1 |
| 2,330,863 | 10/43 | Bonnafe | 29—95.1 |
| 2,683,919 | 7/54 | Psenka | 29—95.1 |
| 2,898,670 | 8/59 | Pernack | 29—95.1 |
| 2,986,801 | 6/61 | Mently | 29—95.1 |
| 2,987,801 | 6/61 | Psenka | 29—95.1 |

FOREIGN PATENTS

| | | |
|---|---|---|
| 22,248 | 12/20 | France. |
| 414,331 | 8/34 | Great Britain. |
| 592,888 | 10/47 | Great Britain. |
| 422,705 | 6/47 | Italy. |

WILLIAM W. DYER, JR., *Primary Examiner.*